(12) United States Patent
Kord (10) Patent No.: US 11,640,202 B2
(45) Date of Patent: May 2, 2023

(54) MOTION CAPTURE FOR PERFORMANCE ART

(71) Applicant: Ali Kord, Lewes (GB)

(72) Inventor: Ali Kord, Lewes (GB)

( * ) Notice: Subject to any disclaimer, the term of this patent is extended or adjusted under 35 U.S.C. 154(b) by 0 days.

(21) Appl. No.: 17/592,845

(22) Filed: Feb. 4, 2022

(65) Prior Publication Data

US 2022/0253138 A1 Aug. 11, 2022

Related U.S. Application Data

(60) Provisional application No. 63/146,255, filed on Feb. 5, 2021.

(51) Int. Cl.
*G06F 3/01* (2006.01)
*G06F 3/0346* (2013.01)

(52) U.S. Cl.
CPC ............ *G06F 3/014* (2013.01); *G06F 3/0346* (2013.01)

(58) Field of Classification Search
CPC ... A61B 5/6813; A61B 5/1114; A61B 5/7275; A61B 5/744; A61B 5/1112; A61B 5/6824; A61B 2562/0219; A61B 5/7264; G01C 21/18; G01C 17/38; G06F 3/011; G06F 3/014; G06F 3/017; G06F 3/0346; G06K 9/6287; G06V 40/20; G06V 10/82; G06V 10/764; G16H 50/50
See application file for complete search history.

(56) References Cited

U.S. PATENT DOCUMENTS

| | | | |
|---|---|---|---|
| 6,720,949 B1* | 4/2004 | Pryor ...................... | A63F 13/00 345/158 |
| 2007/0044638 A1* | 3/2007 | Egan ....................... | G09B 15/06 84/483.2 |
| 2008/0307945 A1* | 12/2008 | Gatzsche ................. | G10H 1/38 84/477 R |
| 2011/0173204 A1* | 7/2011 | Murillo .................. | A63F 13/213 715/863 |
| 2016/0324447 A1* | 11/2016 | Hallberg .............. | A61B 5/7282 |

* cited by examiner

*Primary Examiner* — Bryan Earles
(74) *Attorney, Agent, or Firm* — GSS Law Group; Gregory Scot Smith; Philip M. Wagner (57) ABSTRACT

A method for controlling aspects of an artistic performance with a motion capture system includes modeling movements of a performer with a biomechanical skeleton, selecting parent and child segments on the biomechanical skeleton, positioning motion capture sensors on a motion capture subject at positions corresponding to the parent and child segments, selecting actions associated with movements of the child segment according to positions of the parent segment within at least two predefined spatial zones, executing actions in a first action group for the child segment when the parent segment is in a first spatial zone, and executing actions in a second action group for the child segment when the parent segment is in a second spatial zone.

14 Claims, 6 Drawing Sheets

```
┌─────────────────────────────────────────────────────┐
│ Examples of setting motion thresholds      1018     │
│ for motion of a child segment              ────     │
│                                                     │
│   ┌───────────────────────────────────────────┐    │
│   │ Minimum magnitude of angular rotation     │    │
│   │ measured by IMU for child segment   1020  │    │
│   └───────────────────────────────────────────┘    │
│                                                     │
│   ┌───────────────────────────────────────────┐    │
│   │ Minimum magnitude of linear displacement  │    │
│   │ measured by IMU for child segment   1022  │    │
│   └───────────────────────────────────────────┘    │
│                                                     │
│   ┌───────────────────────────────────────────┐    │
│   │ Minimum value of pressure measured        │    │
│   │ by pressure sensor on mocap glove   1024  │    │
│   └───────────────────────────────────────────┘    │
│                                                     │
│   ┌───────────────────────────────────────────┐    │
│   │ Minimum magnitude of change in a velocity │    │
│   │ of motion measured by IMU for child segment 1026│
│   └───────────────────────────────────────────┘    │
│                                                     │
│   ┌───────────────────────────────────────────┐    │
│   │ Change in algebraic sign in a velocity  1028│  │
│   │ of motion measured by IMU for child segment │  │
│   └───────────────────────────────────────────┘    │
└─────────────────────────────────────────────────────┘
```

Fig. 7

MOTION CAPTURE FOR PERFORMANCE ART

FIELD OF THE INVENTION

Embodiments are generally related to motion capture methods for measuring linear and/or rotational displacements of parts of a person's body, and more particularly to using predefined spatial boundaries with motion capture measurement data to select or modify aspects of an artistic performance.

BACKGROUND

Motion capture may be performed by positioning a measurement sensor such as an inertial measurement unit (IMU) against a person's body and recording data values from which may be determined changes in angular values, linear displacements, and/or rates of movement for the part of the body to which the IMU is attached. Motion capture may alternatively be accomplished with cameras or other non-contact position-sensing apparatus. Data from motion capture sensors may be used to form a kinematic model, a mathematical model of the positions and movements of the motion capture subject. A biomechanical skeleton is an example of a kinematic model. The measured changes in positions and rates of movement of the measured body locations on the motion capture subject may be applied to corresponding movements and positions of rigid segments and rotatable joints in the biomechanical skeleton. A separate IMU may be positioned on the motion capture subject at each part of the person's body to be represented by a segment and/or joint in the biomechanical skeleton, or IMU data may be extrapolated to estimate the positions of some segments and joints in the biomechanical skeleton.

The kinematic model representing the motion capture subject may be used to operate an apparatus through computer activation of suitable actuators. For example, a biomechanical skeleton configured to emulate a person's movements and body positions may be used to operate a machine, a tool, a vehicle, a musical instrument, a computer keyboard, a joystick, a lighting control panel, an audio synthesizer, or other devices, without the person represented by the kinematic model coming into physical contact with the device being operated.

A kinematic model may be used to control a computer simulation of an actual or imagined apparatus. The simulated apparatus may be referred to as a "virtual device". The virtual device may access audio files or video files which can be modified by interaction with the kinematic model representing movements of the motion capture subject. The kinematic model and the virtual device may appear as components of a computer-generated scene to give audible and visual feedback to a motion capture subject and to present actions associated with the motion capture subject's movements to others. More than one kinematic model may be presented in a computer-generated scene, each kinematic model possibly corresponding to a different motion capture subject, thereby enabling collaborative or competitive activities by persons separated from one another spatially or temporally. Alternately, kinematic models representing actions by one person at different locations or different times may be presented together to create a "self-collaboration".

Dancers, musicians, and other performance artists may use motion capture gloves or other wearable motion capture devices for creative control of audible and visual aspects of a performance. For example, a musician may move their fingers over a surface or through empty space to play a virtual device representing keys on a keyboard. Or, instead of interacting with an emulation of a physical device like a keyboard, a musician may arrange their fingers into predefined gestures to select preferred musical notes or sounds, modify sound volume, modify frequencies present in sounds, or adjust other parameters relating to the sound. A predetermined set of spatial positions of the performer's fingers may have an associated predetermined set of audible and/or visual effects. Movements outside the predetermined range may produce unexpected results or may not be recognized by the virtual device. Sounds to be produced or modified during a performance may be represented as numerical values in a stored computer file and/or may be generated by an audio synthesizer. Sounds may be modified concurrently with the musician's movements or in response to a stored motion capture record of the movements. Pressure sensors or momentary switches may be provided on a glove's fingertips to allow an artist to simulate drumming or other percussive effects by tapping or rubbing the fingertips against a surface. Visual effects such as the color, location, timing, and intensity of virtual or real light sources or images may be controlled by similar means.

Operating a virtual device with a wearable motion capture device may impose limitations on a performance. For example, a motion capture ("mocap") glove configured to detect the positions of a musician's fingers relative to the palm of the hand may be used to play a virtual device representing a keyboard on a piano, organ, or synthesizer. It may be difficult for the musician to calibrate the mocap glove with sufficient accuracy to resolve small differences in finger positions needed to detect which octave of a keyboard is being played, or which manual is being played for a virtual instrument with more than one manual.

Real instruments controlled by means other than, or in addition to, positions of a musician's fingers may be difficult to emulate with a virtual instrument operated by a mocap glove. For example, a kinematic model may be configured to play notes on a virtual trumpet by capturing a musician's finger motions and positions for activating virtual trumpet valves, then triggering corresponding audio output from an audio source. Mocap gloves are available with sufficient spatial resolution to detect the seven unique finger positions for operating the three valves on a trumpet. However, emulating a musician's finger positions for activating valves is not sufficient to produce the full range of notes that can be produced by a real trumpet. By controlling tension in the lip muscles, a skilled performer playing a real trumpet can produce many more than the number of natural tones resulting from operation of the valves. Arranging a wearable motion capture device to emulate changes in a musician's finger positions and changes in the musician's lip tension is difficult, possibly requiring hand motions or hand positions that feel unnatural to the musician or are difficult to repeat accurately, and possibly resulting in undesirable limitations in musical expression.

SUMMARY

An example method embodiment includes selecting a parent segment on a biomechanical skeleton; selecting a child segment connected to the parent segment; positioning a first motion capture sensor at a first location on a motion capture subject, the first location corresponding to the parent segment; and positioning a second motion capture sensor at a second location on the motion capture subject, the second location corresponding to the child segment. The example method further includes setting a first rotational limit for a first spatial zone and a second rotational limit for the first spatial zone for the parent segment; setting a first rotational limit for a second spatial zone and a second rotational limit for the second spatial zone for the parent segment; setting a first action to be performed by the child segment; setting a second action to be performed by the child segment; executing the first action when the parent segment is positioned in the first spatial zone; and executing the second action when the parent segment is in the second spatial zone.

Motion by the child segment may optionally be greater than a first motion threshold for the first action to be performed. Motion by the child segment may optionally be greater than a second motion threshold for the second action to be performed. The first motion threshold and/or the second motion threshold may optionally be set to any one or more of the following conditions for a motion threshold, individually or in any combination: setting the motion threshold to a minimum magnitude of angular rotation; setting the motion threshold to a minimum magnitude of linear displacement; setting the motion threshold to a minimum pressure value from a pressure sensor, and setting the motion threshold to a minimum magnitude of a change in a velocity of motion of the child segment.

The example method embodiment optionally further includes defining a first action group including a set of actions to be performed following motion by the child segment, wherein the first action is one of the set of actions in the first action group. A selected one of the first action group is optionally performed when the parent segment is positioned in the first spatial zone. The example method embodiment optionally further includes defining a second action group including another set of actions to be performed following motion by the child segment, wherein the second action is one of the set of actions in the second action group. An action group optionally represents a set of movements and/or positions of a child segment that may be repeated at different locations of a parent segment. Alternatively, the set of actions in an action group may be different from the set of actions in another action group.

Execution of the second action may optionally be prevented when the parent segment is in the first spatial zone. Execution of the first action may optionally be prevented when the parent segment is in the second spatial zone.

The example method embodiment optionally further includes setting a first rotational limit and a second rotational limit for each of an additional plurality of spatial zones. Adjacent spatial zones may optionally have shared limits. For example, the first rotational limit for the second spatial zone and the second rotational limit for the first spatial zone may optionally be set at a same value of a rotation angle of the parent segment. Alternately, the first rotational limit and the second rotational limit for each spatial zone may be set such that there is an intervening space between the spatial zones.

BRIEF DESCRIPTION OF THE DRAWINGS

FIG. 2 is a simplified pictorial view of examples of a motion capture glove and other motion capture sensors on a person's arms. FIG. 2 further illustrates examples of reference directions used herein.

DESCRIPTION

The disclosed example method embodiments represent movements by a motion capture subject with a kinematic model such as a biomechanical skeleton, associate at least two alternative actions with a child segment in the kinematic model, associate a first of the alternative actions for the child segment with a first spatial zone for a parent segment connected to the child segment, associate a second of the alternative actions with a second spatial zone for the parent segment, and select from among the alternative actions for the child segment according to the spatial zone the parent segment is positioned in. Each spatial zone for the parent segment is bounded by a first rotational limit and a second rotational limit about a selected spatial axis.

Whenever the parent segment is between the first rotational limit and the second rotational limit for a spatial zone, the child segment may perform the action or actions associated with the spatial zone in which the parent segment is located. When the parent segment moves to a different spatial zone, a different set of actions may be performed by the child segment, even when the parts of the child segment are in a same spatial relationship to one another in both spatial zones, or part of the child segment is on one spatial zone and another part of the child segment is in another spatial zone.

As an example, consider a performance artist playing a virtual representation of an electronic organ. The artist may wear a motion capture (mocap) glove or similar equipment to detect and record the angles between the fingers on a hand. Sufficient movement of the fingers may trigger audio output associated with keys on a virtual keyboard, i.e., the artist is controlling the production of sounds by "playing" a keyboard that is not physically present. A particular arrangement of the fingers, and of the corresponding segments and joints in a biomechanical skeleton representation of the artist's hand, may be used by the artist to create the same combination of virtual keys in more than one octave of the virtual keyboard. It may be difficult, however, for the artist to configure a mocap glove alone to recognize when a hand is positioned in one octave or another octave for the same arrangement of the fingers. Similarly, it may be difficult to configure the mocap glove to recognize which manual of a multi-keyboard instrument a same configuration of the fingers is intended to play.

Using a mocap glove alone may lead to uncertainty about which part of a virtual instrument a particular arrangement of the fingers is being applied to. The disclosed method embodiments resolve this uncertainty by changing the actions assigned to each finger according to a detected angle of the parent segment. The parent segment may be, for example, either the forearm or upper arm according to the performer's preference. When the measured rotational angle of the parent segment falls in a selected spatial zone, the child segment activates virtual keys, levers, valves, switches, etc. assigned as an action or action group to that spatial zone for the virtual instrument. When the parent segment is positioned in another spatial zone, the child segment produces a different set of effects assigned to a second action group, the second action group possibly corresponding to a different location on the virtual instrument, or alternatively effects from a different virtual instrument.

In some embodiments, spatial zones are nonoverlapping and may optionally be separated by intervening space from one another. Adjacent spatial zones may optionally have a shared rotational limit. Spatial zones may alternately be partially overlapping at the discretion of the artist. Spatial zones may optionally be separated from one another with respect to some rotational axes and partially overlapping with respect to other rotational axes.

The example embodiment is effective for performing on a virtual keyboard simulating a full size, multi-manual keyboard instrument. In other applications, an example embodiment enables a performer to play a virtual instrument when the corresponding real instrument requires movements in addition to or instead of hand movements. For example, as previously noted it is difficult to emulate a trumpet and some other brass instruments with a motion capture glove alone because providing a function corresponding to a change in the performer's lip tension is difficult to implement. The example method embodiment can resolve this problem by assigning to a child segment, for example a child segment representing a hand wearing a mocap glove, a group of notes in a selected octave to the complete set of discrete finger positions associated with operating the valves on the real trumpet, and associating the group of notes with a spatial zone defined for a parent segment. The parent segment may be, for example, the forearm and/or upper arm at the performer's discretion. A different set of notes, for example notes in another octave, may be assigned to the child segment with the same finger positions detected by the mocap glove, i.e. the same valve positions on the real trumpet, but for the parent segment moved into another spatial zone. The performer's movement of the parent segment from one spatial zone to another causes a corresponding change in the set of notes associated with movements of the child segment, leading to a transition from one set of notes in a first action group to a second set of notes in the second action group for the child segment. A performer may find it reasonably intuitive to shift octaves by tilting the virtual trumpet by raising the forearm and/or upper arm, but may choose another action of the parent and child segments if desired.

The disclosed method embodiments are further effective for performances using virtual devices having no physical counterpart. For example, a performance artist may control audio effects with one virtual device and visual effects with another virtual device with both virtual devices positioned in a virtual performance space. Functions associated with audio effects may be associated with movements of a child segment for a parent segment, e.g. the upper arm, positioned in one spatial zone, and functions associated with video effects may be associated with movements of the child segment with positioning of the parent segment in another spatial zone. Associating sets of actions for a child segment with spatial zones for a parent segment allows many more actions to be performed than could easily be represented by a motion capture glove alone.

Figure 1:
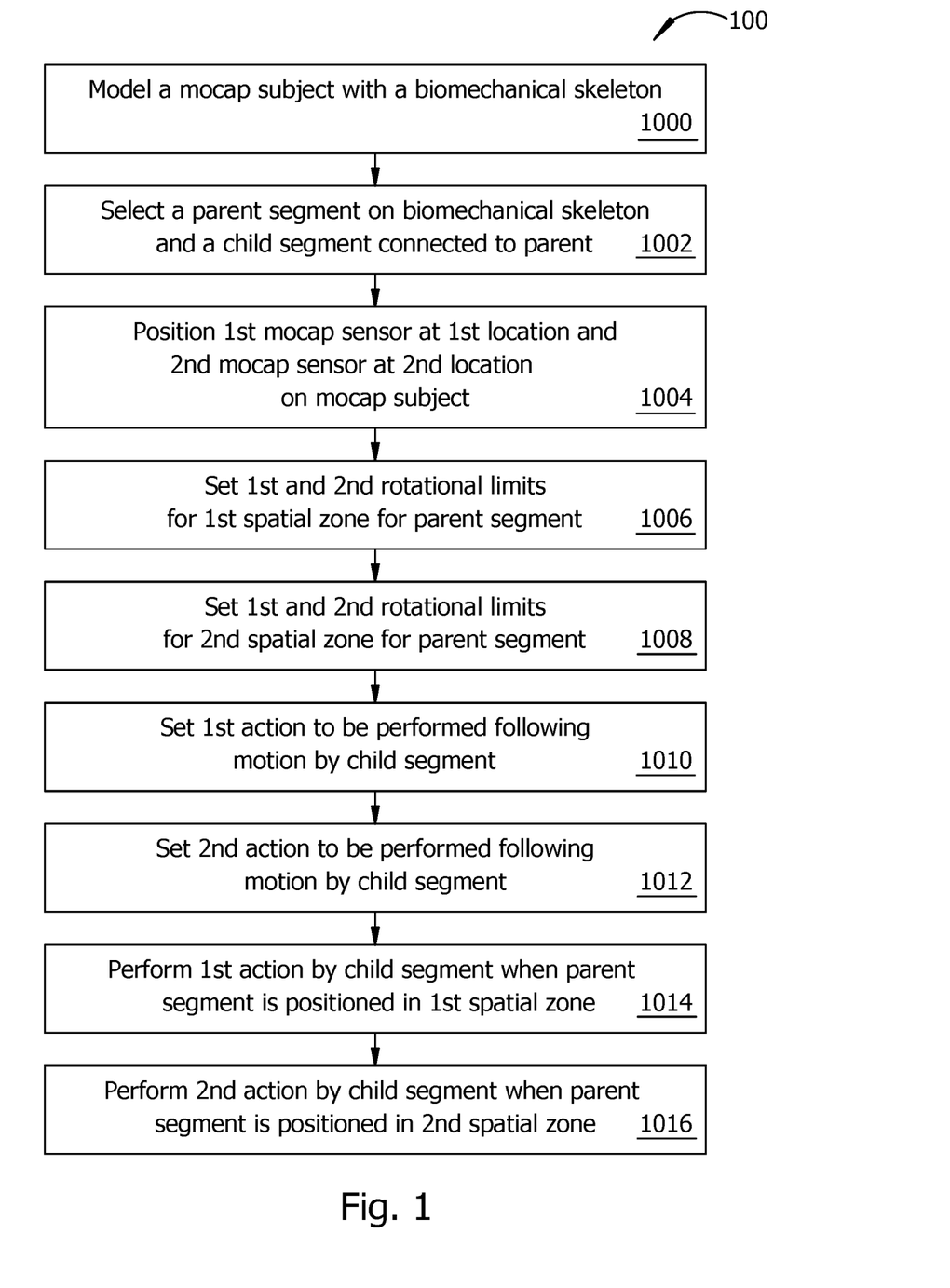
FIG. 1 is a block diagram with examples of steps performed in the disclosed method embodiment.

FIG. 1 shows some steps included in an example method embodiment 100. The method embodiment 100 begins at step 1000 by modelling a motion capture subject with a biomechanical skeleton. Next, at step 1002 a parent segment is selected on the biomechanical skeleton. A child segment connected to the parent segment is also selected, with the preferred relationship that moving the parent segment also moves the child segment, but moving the child segment may not move the parent segment.

At step 1004, a mocap sensor is positioned at a first location on the motion capture subject, and a second mocap sensor is positioned at a second location on the motion capture subject. Examples of a mocap sensor include, but are not limited to, an IMU and a pressure sensor. One of the mocap sensors is preferably positioned at a location on the motion capture subject corresponding to the parent segment of the biomechanical skeleton. Another mocap sensor is preferably positioned on the motion capture subject at a location corresponding to the child segment of the biomechanical skeleton.

At step 1006, a first rotational limit and a second rotational limit are set as boundaries for a first spatial zone. The parent segment may be considered to be within the first spatial zone when positioned between the first and second rotational limits and optionally when positioned at one of the rotational limits. Each pair of rotational limits applies to a selected spatial axis sensed by the motion capture apparatus. A spatial zone may have first and second rotational limits for any one spatial axis, additional rotational limits for any two mutually perpendicular spatial axes, or rotational limits for all three mutually perpendicular spatial axes.

At step 1008, first and second rotational limits are set for a second spatial zone. As for the first spatial zone, the second spatial zone may have first and second rotational limits for any one spatial axis, additional rotational limits for any two mutually perpendicular spatial axes, or rotational limits for all three mutually perpendicular spatial axes.

At step 1010, a first action to be performed following motion by the child segment is set. Optionally, a first action group is defined for the child segment, with the members of the first action group possibly including actions assigned to selected elements of the child segment. For example, when a child segment is a hand of a biomechanical skeleton, an action group may be specific sounds associated with each finger. An action of a child segment may refer to a signal for activating an actuator or a parameter for adjusting the contents of a previously stored computer file.

At step 1012, a second action to be performed following motion by the child segment is set. Optionally, a second action group is defined for the child segment, with the members of the second action group possibly including actions assigned to selected elements of the child segment.

As suggested at step 1014, the example method embodiment performs the first action defined for the child segment when the parent segment is positioned in the first spatial zone. Alternately, the method performs any one or more of the actions from the first action group when the parent segment is positioned in the first spatial zone.

As suggested at step 1016, the example method embodiment performs the second action defined for the child segment when the parent segment is positioned in the second spatial zone. Alternately, the method performs any one or more of the actions from the second action group when the parent segment is positioned in the first spatial zone.

When the first action is performed in response to presence of the parent segment in the first spatial zone, the method optionally includes preventing performance of the second action. When the second action is performed in response to presence of the parent segment in the second spatial zone, the method optionally includes preventing performance of the first action.

Figure 2:
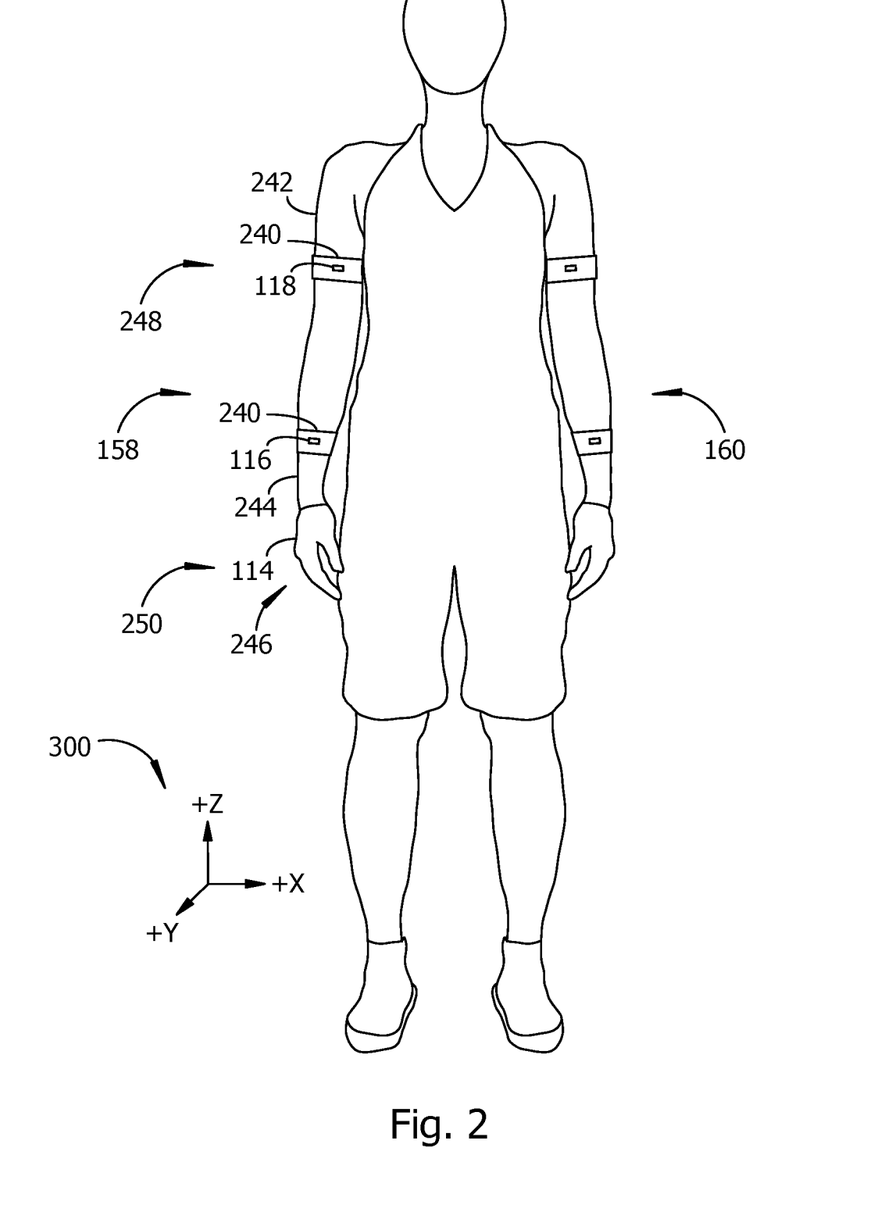

FIG. 2 shows examples of positions of motion capture sensors suitable for use with the example method embodiments. A representation of a person facing the viewer is shown with an example of a mocap glove 114 worn on the right hand 246, an example of a forearm inertial measurement unit (IMU) 116 attached to an elastic band 240 worn on the right forearm 244, and an example of an upper arm IMU 118 attached to another elastic band 240 worn on the right upper arm 242. The forearm IMU 116 further represents a first mocap sensor location 248 optionally corresponding to an example of a parent segment 192 of a kinematic model. The mocap glove 114 further exemplifies a second mocap sensor location 250 optionally corresponding to a child segment 194 of a kinematic model. Other parts of the kinematic model may optionally be selected as the parent segment or child segment. A set of right arm sensors 158 including the motion capture glove, forearm IMU, and upper arm IMU are optionally duplicated in a set of left arm sensors 160.

FIG. 2 further shows examples of directions 300 referenced herein. The Z axis extends vertically from a surface upon which the person stands toward the person's head. The X axis extends transversely in a horizontal plane parallel to the surface upon which the person stands. The Y axis extends toward the viewer from plane of the drawing. Referencing the example directions 300, rotating the right arm at the shoulder joint so that the forearm and hand point at the viewer represents a rotation of the shoulder joint about the X axis.

Figure 3:
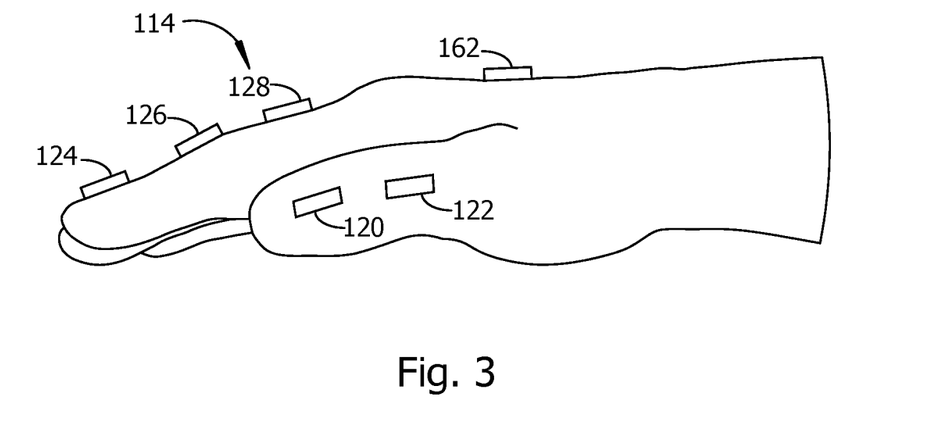
FIG. 3 is a side view of an example motion capture glove in accord with the disclosed method embodiments.

FIG. 3 shows a side view of a mocap glove 114 in accord with the example method embodiment 100. Attached to the thumb of the glove are examples of a first IMU1 120 and a second IMU2 122. Attached to the index finger of the glove 114 are examples of a first IMU1 124, a second IMU2 126, and a third IMU3 128. A carpal IMU 162 positioned on the back of the glove captures position and/or rotation data for kinematic model segments and joints representing positions and/or rotations of the back of the mocap subject's hand. The example method embodiments 100 are operable with fewer than the number of mocap sensors represented by IMUs in FIG. 3.

Figure 4:
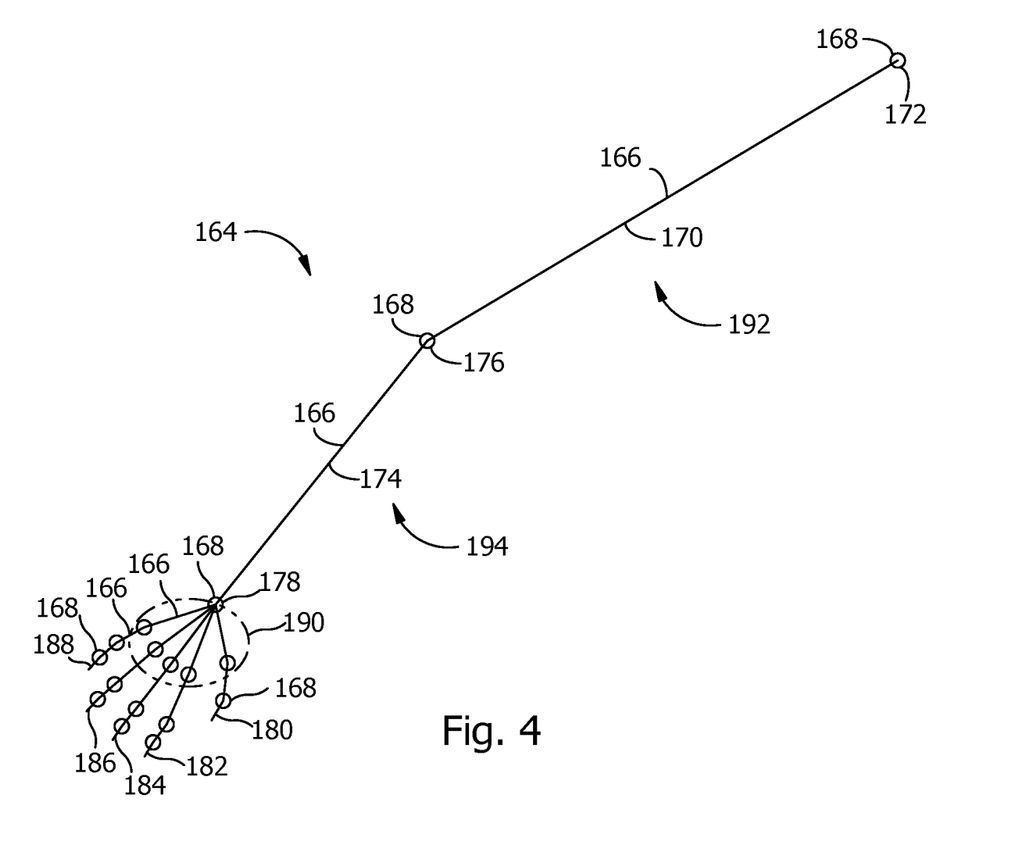
FIG. 4 is a schematic representation of a biomechanical skeleton for a right arm. The example biomechanical skeleton is positioned in the YZ plane for comparison to the position of the right arm in FIG. 2, with a viewing direction parallel to the X axis toward the back of the right hand.

FIG. 4 shows an example kinematic model of a right arm. The example kinematic model is implemented as a biomechanical skeleton 164 with rigid segments 166 coupled to one another through intervening rotatable joints 168. As suggested in the figure, rigid segments may be shown as mathematical line segment entities. Rigid segments may alternatively be presented as geometric shapes having surfaces and volumes. As used herein, a rigid segment is a mathematical model of an ideal structural element having no flexibility, i.e., the rigid segment does not deflect when placed under a load.

In the example biomechanical skeleton 164 of FIG. 4, a rigid upper arm segment 170 extends from a rotatable shoulder joint 172 to a rotatable elbow joint 176. A rigid forearm segment 174 extends from the elbow joint 176 to a rotatable wrist joint 178. One or more rigid segments 190 representing the metacarpal bones of the motion capture subject's hand extend from the wrist joint 178 to rotatable joints 168 at the base of the thumb 180, first finger 182, second finger 184, third finger 186, and fourth finger 188. Each finger and the thumb are further optionally modeled with rigid segments 166 and rotatable joints 168 simulating the phalanges and joints of a human hand. As suggested in FIG. 4, a parent segment 192 may optionally be selected to include the shoulder joint 172 and upper arm segment, and a child segment may optionally be selected to include the elbow joint 176, the forearm segment 174, and all the segments and joints of the wrist and hand. Other choices of parent segment and child segment are also possible according to the nature of a virtual device being controlled and the preferences of the person controlling the virtual device.

Figure 5:
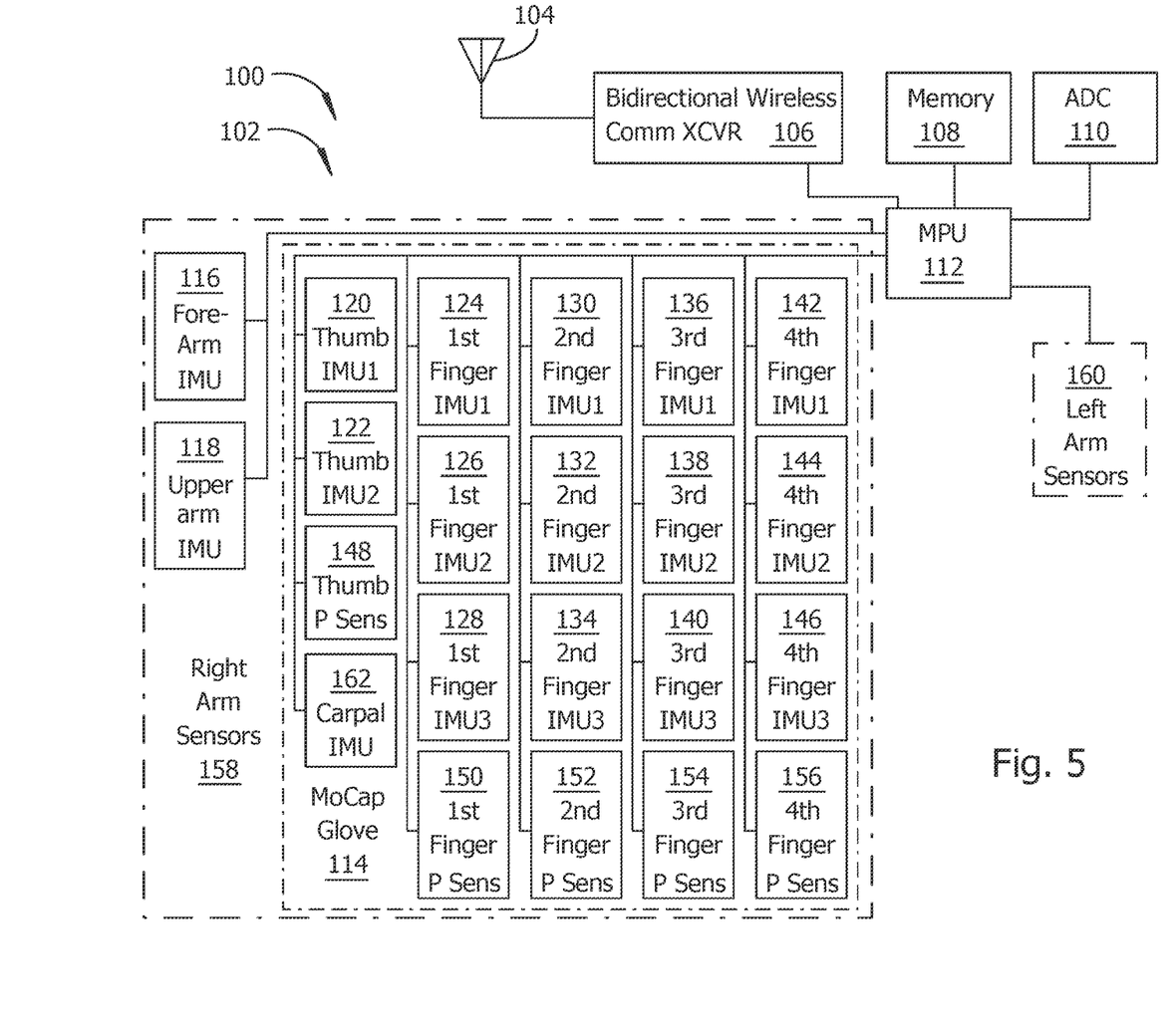
FIG. 5 is a block diagram of an example motion capture system in accord with the disclosed method embodiments.

An example of a motion capture apparatus 102 in accord with the example method embodiment 100 is shown in FIG. 5. The illustrated example motion capture glove 114 has attached to the thumb of the glove a thumb IMU1 120, a thumb IMU2 122, and a thumb pressure sensor 148 for detecting when the mocap glove contacts a solid object. A first finger IMU1 124, a first finger IMU2 126, a first finger IMU3 128, and a first finger pressure sensor 150 are attached to the first finger of the mocap glove. A second finger IMU1 130, a second finger IMU2 132, a second finger IMU3 134, and a second finger pressure sensor 152 are attached to the second finger of the mocap glove. A third finger IMU1 136, a third finger IMU2 138, a third finger IMU3 140, and a third finger pressure sensor 154 are attached to the third finger of the mocap glove. A fourth finger IMU1 142, a fourth finger IMU2 144, a fourth finger IMU3 146, and a fourth finger pressure sensor 156 are attached to the fourth finger of the mocap glove. A mocap glove 114 may optionally include fewer sensors than shown in the example of FIG. 5. The set of right arm sensors 158 optionally includes any one or more of the preceding IMUs described for the mocap glove 114 and preferably further includes at least one of the forearm IMU 116 and the upper arm IMU 118. A set of left arm sensors 160 may optionally be provided, with the set of left arm sensors including any one or more of the sensors described for the right arm sensors 158.

All IMUs and optional pressure sensors are preferably connected for signal communication with a microprocessor (MPU) 112. An analog to digital converter (ADC) 110 may be provided to convert signals from motion capture sensors to digital values stored in a memory 108 accessible to the MPU 112. The MPU 112 may be connected for signal communication with other devices through a bidirectional wireless communications transceiver 106. An antenna 106 is connected for exchange of electrical signals with the transceiver 106.

Figure 6:
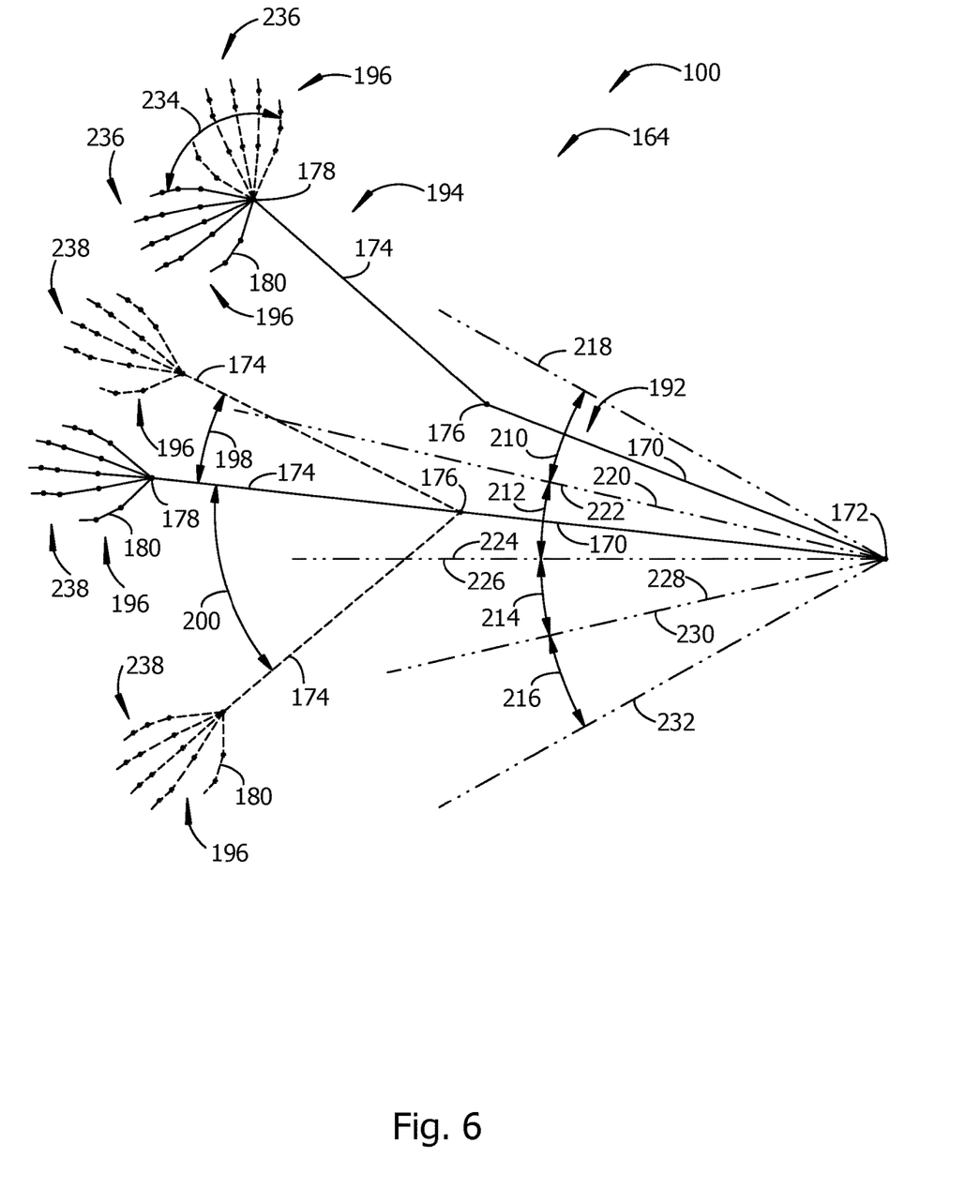
FIG. 6 shows several example positions of the hand, forearm, and upper arm of the biomechanical skeleton example of FIG. 4, further illustrating examples of rotational limits for defining spatial zones according to positions of a selected parent segment.

FIG. 6 illustrates several aspects of the example method embodiment 100 in a view parallel to the Z axis of examples of a biomechanical skeleton 164. The location of the thumb 180 on the hand 196 of the biomechanical skeleton suggests that the view in FIG. 6 may be interpreted as downward onto the back of the right hand, although other interpretations are possible. An example spatial volume in which a motion capture subject moves is preferably divided into at least two, and optionally more than two spatial zones, each spatial zone associated with a range of rotational angles for a parent segment of the biomechanical skeleton. In the example of FIG. 6, a virtual performance space is divided into four spatial zones, a first spatial zone 210, a second spatial zone 212, a third spatial zone 214, and a fourth spatial zone 216. Each spatial zone corresponds to a range of movement for an example parent segment 192 represented in the example of the figure by an upper arm segment 170 extending from the shoulder joint 172 to the elbow joint 176 of the biomechanical skeleton.

In the example of FIG. 6, adjacent spatial zones have shared rotational limits. Other arrangements of spatial zones are possible at the discretion of the artist. An angular range of the first spatial zone 210 in the example of FIG. 6 extends from a first rotational limit 218 to a second rotational limit 220. An angular range of the second spatial zone 212 extends from a first rotational limit 222 to a second rotational limit 224. An angular range of the optional third spatial zone 214 extends from a first rotational limit 226 to a second rotational limit 228. An angular range of the optional fourth spatial zone 216 extends from a first rotational limit 230 to a second rotational limit 232. All of the example rotational limits in the example of FIG. 6 apply to a same selected axis of rotation passing through the shoulder joint 172. Additional rotational limits may optionally be determined for each spatial zone for either one or both of the remaining two mutually orthogonal spatial axes. Each limit may be assigned a position in the virtual performance space by the motion capture subject moving the body part corresponding to the selected parent segment to a preferred limiting angle for each spatial zone and recording the corresponding rotational limit value for the spatial zone.

Continuing with the example of FIG. 6, for every location of a parent segment 192 within one spatial zone, an action, or alternately a group of actions, is set for the child segment 194. When the upper arm segment 170 is positioned in the first spatial zone 210, movements of the child segment 194 select one or more actions from an action group 236 for zone 1. The action group 236 for spatial zone 1 applies to all hand positions over the example range of rotation 234 of the hand about the wrist joint and all rotations of the forearm segment 174 about the elbow joint. The action group 236 may include, for example, a key to be activated on a virtual keyboard by each finger according to positions and angles detected by an IMU, a valve to be operated on a virtual trumpet for each finger, and so on according to the controls present on a virtual device.

When the upper arm segment 170 is positioned in the second spatial zone 212, movements of the child segment select one or more actions from an action group 238 for spatial zone 2. The action group 238 for spatial zone 2 applies to all positions of the child segment 194 including the hand 196 and forearm segment 174 as long as the parent segment is positioned within spatial zone 2, as suggested in FIG. 6. FIG. 6 further shows that the action group 238 optionally applies to all positions of the child segment 194 when the parent segment remains within the boundaries of spatial zone 2, even when parts of the child segment, for example the hand and/or part of the forearm segment, rotate through an angle 198 or another angle 200 about the elbow joint 176 and/or wrist joint 178 that cause parts of the child segment to extend outside the boundaries for the spatial zone of the parent segment. The second action group 23 may include, for example, a key to be activated on a virtual keyboard by each finger according to positions and angles detected by an IMU, a valve to be operated on a virtual trumpet for each finger, and so on according to the controls present on a the virtual device, with the actions in the second action group optionally different than the actions in the first action group.

Figure 7:
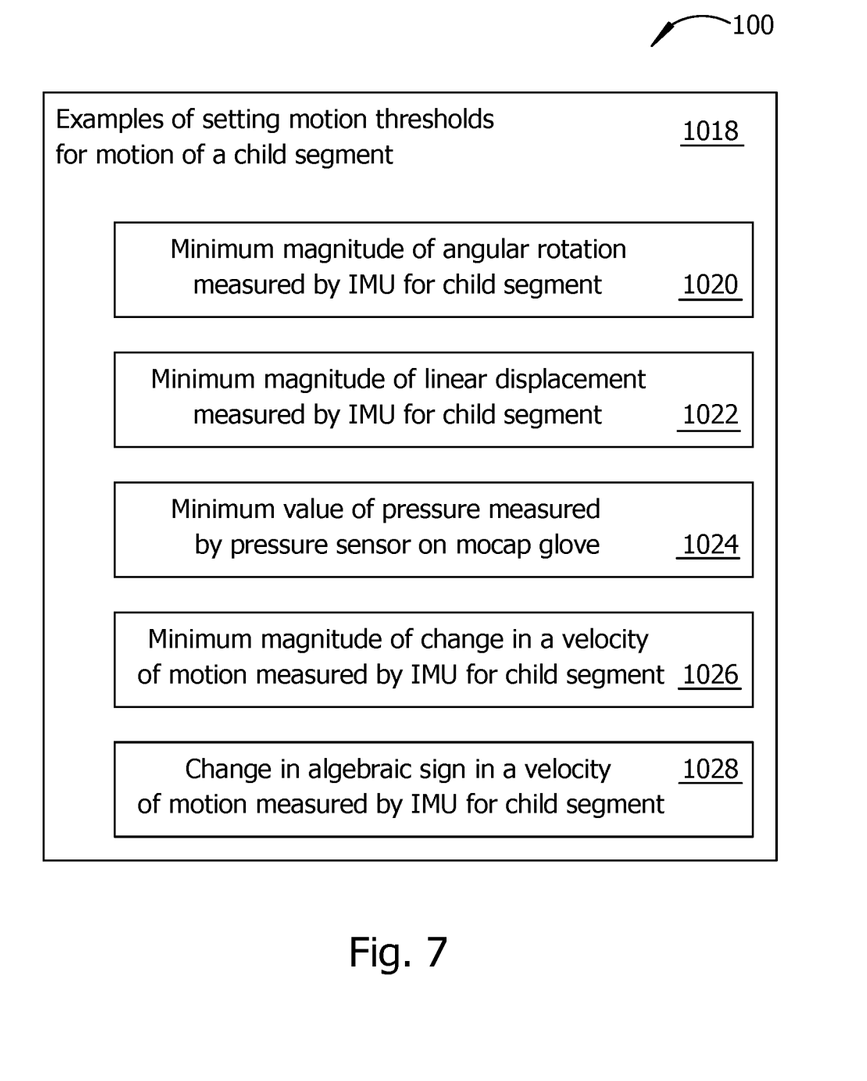
FIG. 7 is a block diagram showing examples of steps for setting motion thresholds for a child segment.

It may be desirable to establish motion thresholds for detecting a preferred level of motion of a child segment needed to trigger an action associated with a spatial zone of a parent segment. FIG. 7 includes examples 1018 of steps for setting motion thresholds to define minimum child segment movement needed to trigger an action such as a key activation or a valve activation with the biomechanical skeleton. At step 1020, setting a motion threshold includes setting a minimum magnitude of angular rotation measured for a child segment by an IMU. At step 1022, setting a motion threshold includes setting a minimum magnitude of linear displacement measured by an IMU for the child segment. At step 1024, setting a motion threshold includes setting a minimum value of pressure measured by a pressure sensor on a mocap glove. At step 1026, setting a motion threshold includes setting a minimum magnitude of a change in velocity of motion measured by an IMU. At step 1028, setting a motion threshold includes detecting a change in the algebraic sign of a velocity measured by an IMU. The examples of FIG. 7 may be applied in any order and in any combination of one or more of the example steps.

Unless expressly stated otherwise herein, ordinary terms have their corresponding ordinary meanings within the respective contexts of their presentations, and ordinary terms of art have their corresponding regular meanings. Where used, the expression "and/or" relating two elements A and B, as in "A and/or B", is equivalent in meaning to "A without B, or B without A, or A and B together".

What is claimed is:

1. A method, comprising:
    forming a kinematic model of a motion capture subject as a biomechanical skeleton including a parent segment rotatably coupled to a child segment;
    positioning a first motion capture sensor at a first location on the motion capture subject, the first location corresponding to the parent segment;
    positioning a second motion capture sensor at a second location on the motion capture subject, the second location corresponding to the child segment;
    setting a first rotational limit for a first spatial zone for the parent segment and a second rotational limit for the first spatial zone;
    setting a first rotational limit for a second spatial zone for the parent segment and a second rotational limit for the second spatial zone;
    setting a first action to be performed by the child segment when a rotational angle of the parent segment is between the first rotational limit for the first spatial zone and the second rotational limit for the first spatial zone;
    setting a second action to be performed by the child segment when the rotational angle of the parent segment is between the first rotational limit for the second spatial zone and the second rotational limit for the second spatial zone;
    setting a motion threshold to a minimum magnitude of angular rotation measured by the second motion capture sensor;
    determining the rotational angle of the parent segment from data recorded with the first motion capture sensor;
    determining a rotational angle of the child segment from data recorded with the second motion capture sensor;
    performing the first action with the child segment when the rotational angle of the parent segment is between the first rotational limit for the first spatial zone and the second rotational limit for in the first spatial zone and the rotational angle of the child segment is greater than the motion threshold; and
    performing the second action with the child segment when the rotational angle of the parent segment is between the first rotational limit for the second spatial zone and the second rotational limit for the second spatial zone and the rotational angle of the child segment is greater than the motion threshold.

2. The method of claim 1, further including in the first motion threshold a minimum magnitude of linear displacement.

3. The method of claim 1, further including in the first motion threshold a minimum pressure value of pressure from a pressure sensor.

4. The method of claim 1, further including in the first motion threshold a minimum magnitude of a change in a velocity of motion of the child segment.

5. The method of claim 1, further comprising defining a first action group including a set of actions to be performed by the child segment when the rotational angle of the parent segment is between the first rotational limit for the first spatial zone and the second rotational limit for the first spatial zone and the rotational angle of the child segment is greater than the motion threshold, wherein the first action group includes the first action.

6. The method of claim 5, wherein a selected one of the first action group is performed when the rotational angle of the parent segment is between the first rotational limit for the first spatial zone and the second rotational limit for the first spatial zone and the rotational angle of the child segment is greater than the motion threshold.

7. The method of claim 5, further comprising defining a second action group including another set of actions to be performed when the rotational angle of the parent segment is between the first rotational limit for the second spatial zone and the second rotational limit for the second spatial zone and the rotational angle of the child segment is greater than the motion threshold, wherein the second action group includes the second action.

8. The method of claim 1, further comprising preventing performing the second action when the rotational angle of the parent segment is between the first rotational limit for the first spatial zone and the second rotational limit for the first spatial zone.

9. The method of claim 1, further comprising preventing performing the first action when the rotational angle of the parent segment is between the first rotational limit for the second spatial zone and the second rotational limit for the second spatial zone.

10. The method of claim 1, further comprising setting a first rotational limit and a second rotational limit for each of an additional plurality of spatial zones.

11. The method of claim 1, further comprising setting the first rotational limit for the second spatial zone and the second rotational limit for the first spatial zone at a same value of the rotational angle of the parent segment.

12. The method of claim 1, further comprising setting the first rotational limit and the second rotational limit for each spatial zone to form an intervening space between the spatial zones.

13. The method of claim 1, further comprising representing an upper arm of the motion capture subject with the parent segment and representing a forearm, a wrist, and a finger of the motion capture subject with the child segment.

14. The method of claim 1, further comprising representing a forearm of the motion capture subject with the parent segment and representing a wrist and a finger of the motion capture subject with the child segment.

* * * * *